United States Patent Office 3,286,981
Patented Nov. 22, 1966

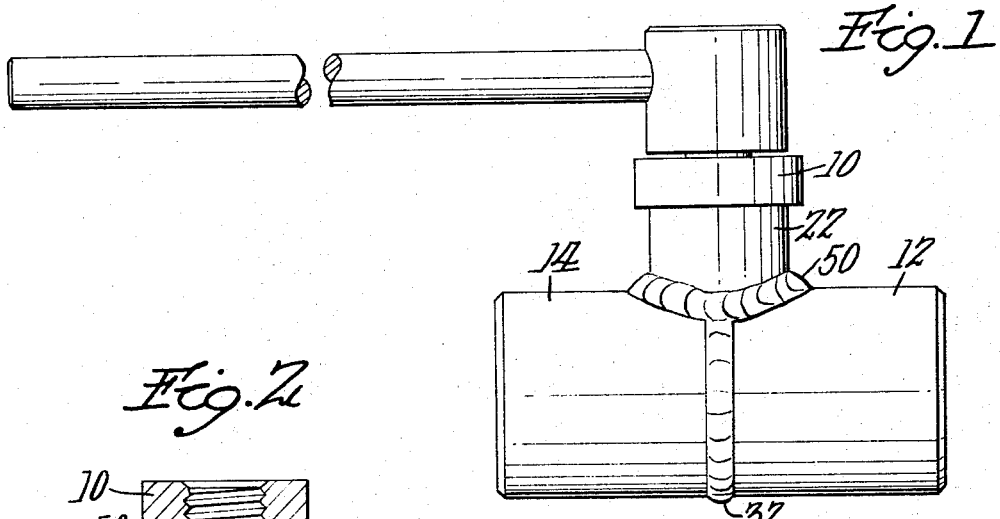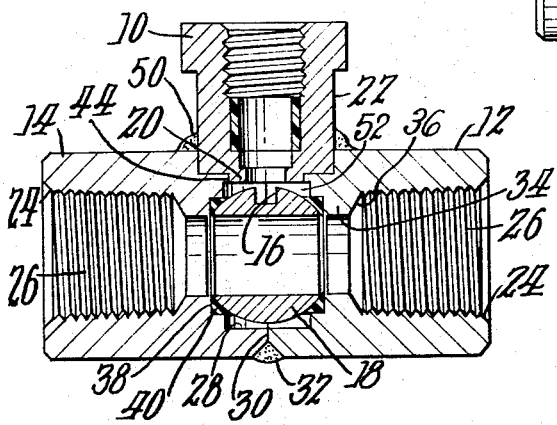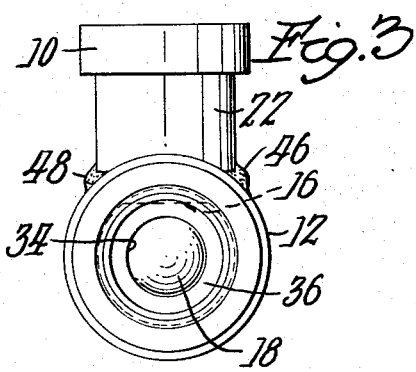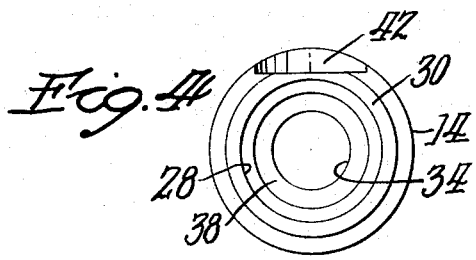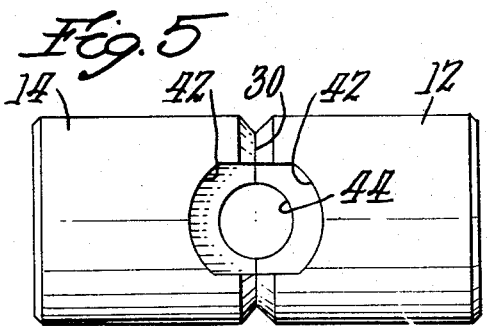

3,286,981
BALL VALVE
William A. Brice, South Portland, Maine, assignor, by mesne assignments, to Bancroft & Martin, Inc., South Portland, Maine, a corporation of Maine
Filed June 8, 1964, Ser. No. 373,301
3 Claims. (Cl. 251—315)

This invention relates to a new and improved ball valve and particularly to a method of making the same, greatly simplifying and improving the construction and rendering the manufacture thereof more economical.

The principal object of the present invention resides in the provision of a ball valve construction which comprises three main parts in addition to the sphere, these parts being two separate end portions which are provided adjacent corresponding ends thereof with seats for annular seals between which the ball is to be seated in tight relatively compressed association therewith, said end portions being essentially machine screw parts which are economically manufactured in large quantity; the third part of the valve comprising a bonnet through which extends the operating handle for the valve, said three parts being welded together with the ball and two end seals only in position, the valve then being completed by applying the handle and a gland or the like therefor in the bonnet.

One problem involved resides in the fact that it has heretofore been found impossible or impractical to fabricate a ball valve housing by welding due to the heat which spoils the seals. The rubber or plastic end rings or seals became distorted or even destroyed due to the heat involved in the welding operation and distortion would sometimes occur in other parts also.

However in the present invention the parts are so arranged that the heat from the welding operation is dissipated in part by the passage of a coolant through the valve during the welding operation and also by reason of the construction of the end pieces and the relationship of the ball seals and the sphere with respect thereto.

Other objects and advantages of the invention will appear hereinafter.

Reference is to be had to the accompanying drawings, in which:

FIG. 1 is a view in elevation illustrating the valve;
FIG. 2 is a longitudinal section therethough;
FIG. 3 is an end view of the valve;
FIG. 4 is an end view of one of the valve ends prior to assembly thereof, and
FIG. 5 is a view illustrating the two end pieces in position ready to be welded.

In carrying out the present invention there are provided as for instance as machine screw parts, a bonnet 10 and two end pieces 12 and 14. The bonnet is to contain a handle which may be of any desired description and is provided with a passage from end to end thereof so that the handle can extend into the cross slot 16 of the sphere 18. The exact construction of the bonnet is not particularly pertinent to the present invention except for the fact that it is provided with a reduced annular flange 20 at the lower end thereof and in general is cylindrical in shape as to the main body portion 22 thereof.

The ends 12 and 14 are alike. Each is conveniently made on a screw machine and is hollow from end to end thereof having a relatively large opening at one end as at 24 being tapped as at 26 for the reception of a pipe. Each end 12 and 14 provides for one-half of the housing through which the material to be valved flows.

The opposite end of each end piece from the opening at 24 is provided with a similar size opening which is indicated at 28. In FIG. 2 the ends 12 and 14 are shown as joined together at their extreme inner ends indicated at the area 30, and they are welded together generally annualarly as indicated by the weld 32. To this end the outside edges at their ends 30 are beveled.

Inwardly from ends 30 each of the end pieces is provided by an inwardly extending annular rib or rim 34. It may be of any shape at 36 facing the open end 24 but at the opposite side facing end 30 it is provided with an inset annular recess 38 for the reception of a rubber or plastic sealing ring 40. There is of course one such ring seated on the annular shelf formed by the annular recess 38 and these encompass the sphere 18 and act as seals therefor, rendering the valve leakproof.

Each of the ends 12 and 14 is also provided with a milled out portion as at 42, this forming a generally circular indentation which receives the inner end of the body 22 of the bonnet as well as the reduced outstanding rim at 20. This rim at 20 extends into a hole 44 formed in the ends and centers the bonnet in position as shown in FIG. 5.

Referring now to FIG. 3 there is shown here a convenient way in which the parts are welded together. First the area at 46 is welded, thus tacking the bonnet to the two ends. The device is then rotated until the welding action arrives at the area 48 where the bonnet is again tacked to the two end pieces, the latter now being fully welded together. Then the bonnet is welded with respect to the two end pieces all about the mating edges thereof as indicated at 50 in FIG. 2.

Referring now to FIG. 2 it will be seen that the sphere is mounted upon the two end seals 40, 40 and that the handle can be assembled through the bonnet and the slot 16 for turning the sphere between the open and closed positions thereof. The welding operation is preferably done with the sphere in the open position as shown in FIG. 2 so that cold air or water can be circulated or other coolant during the welding operation to provide for cooling the same. On the other hand it will also be seen that the end seals 40 and the sphere are mounted in such a way as to be rather remote from the areas of welding as by the ribs extending inwardly as at 34.

The parts are so made that when the ends 30 of the two end pieces are placed together as shown in FIG. 2, the ball places the end seals 40 under compression. The welding is carried out in this position of the parts and in the compressed condition of the end seals so that as soon as the welding is completed the valve merely needs to have the handle assembled with respect thereto in more or less the usual manner, and the valve is completely ready for use with the end seals completely sealing the sphere.

If a gas coolant is used, the sphere is preferably cocked to allow the coolant into the cylindrical chamber 52, but if liquid is used, the ball is positioned to avoid passage of liquid into this chamber.

Having thus described my invention and the advantages thereof, I do not wish to be limited to the details herein disclosed, otherwise than as set forth in the claims, but what I claim is:

1. In a welded ball valve of the type in which the seals are in place, the valve is in its open position and a coolant flows through the open valve during welding, a three part housing, two parts being end members butted together and one part being a bonnet member, said members having passageways extending from end to end with their axes intersecting, each end member including an integral internal annular rib between the ends of its passageway, the abutting portions of the end members providing a cylindrical chamber with the proximate rib faces being the end boundaries thereof, the proximate face of each rib having an annular recess spaced radially inwardly of the cylindrical chamber wall, an elastic ring seal of plastic stock in each recess, an approximately spherical valve member in said chamber having a passageway extending through it, said chamber and said valve member being so dimensioned that said member compresses said rings and so fits said chamber as to establish an air gap between it and said cylindrical wall, said end members also having complemental recessed portions in their abutting end defining a side opening in communication with said chamber, said bonnet member being entrant of said side opening, a valve operating means extending axially through and supported by said bonnet member to be turned relative thereto, and weld seams, one joining the abutting ends of the end members and the other joining the bonnet member to said recessed portions, said internal ribs constituting heat conducting shields for said ring seals during the formation of said weld seams.

2. The ball valve of claim in which the recesses are each in the form of a shelf at the inner edge of each rib.

3. In the manufacture of a ball valve, the steps of providing three housing parts of which two are end members to be assembled with corresponding ends in abutment and the third is a bonnet member, forming a passageway from end-to-end of the bonnet member, forming each end member with a passageway of circular section and extending from end-to-end thereof and with an internal annular rib between its ends in such a position that, on such assembly, a chamber is formed between the proximate rib faces, forming the corresponding ends of the end members with recessed portions shaped and dimensioned to define a bonnet-receiving, side opening on such assembly, positioning an elastic ring seal of plastic stock on each proximate rib face radially inwardly of the cylindrical chamber wall, assembling said end members with their corresponding ends abutting, with the bonnet entrant of the side opening, and with an approximately spherical valve member between said rings and having a passageway extending through it disposed to effect communication between the passageways of the end members, the valve member and chamber being so dimensioned as to compress said rings on such assembly thereby to provide a fluid-tight passage between the members and to fit the chamber without contact with its cylindrical wall and then welding the assembled members together while simultaneously providing a coolant flow through the passage to so cool the ribs as to protect the ring seals against damage from heat absorbed by the members during welding.

References Cited by the Examiner

UNITED STATES PATENTS

| | | | |
|---|---|---|---|
| 2,573,177 | 10/1951 | Bohlen | 251—315 X |
| 2,890,017 | 6/1959 | Shafer | 251—174 |
| 3,195,857 | 7/1965 | Shafer | 251—315 X |

M. CARY NELSON, *Primary Examiner.*

E. FEIN, *Assistant Examiner.*